(12) United States Patent  
Ca

(10) Patent No.: US 8,599,046 B2  
(45) Date of Patent: Dec. 3, 2013

(54) SYSTEMS AND METHODS FOR INFORMING A PILOT OF AN AIRCRAFT ABOUT A TOPOGRAPHICAL CONDITION

(75) Inventor: Santhosh Ca, Kerala (IN)

(73) Assignee: Honeywell International Inc., Morristown, NJ (US)

( * ) Notice: Subject to any disclaimer, the term of this patent is extended or adjusted under 35 U.S.C. 154(b) by 73 days.

(21) Appl. No.: 13/081,339

(22) Filed: Apr. 6, 2011

(65) Prior Publication Data

US 2012/0256767 A1 Oct. 11, 2012

(51) Int. Cl.
 *G08G 5/00* (2006.01)
(52) U.S. Cl.
 USPC ............. 340/947; 701/300; 342/33; 342/63
(58) Field of Classification Search
 USPC .................... 340/945, 946, 947, 948, 953; 244/114 R; 342/33, 34, 63–65; 701/1, 701/300, 301, 302
 See application file for complete search history.

(56) References Cited

U.S. PATENT DOCUMENTS

| | | | |
|---|---|---|---|
| 5,831,575 A | 11/1998 | Gu | |
| 5,978,715 A | 11/1999 | Briffe et al. | |
| 6,112,141 A | 8/2000 | Briffe et al. | |
| 6,720,891 B2 | 4/2004 | Chen et al. | |
| 7,109,889 B2 * | 9/2006 | He | 340/971 |
| 7,564,374 B2 | 7/2009 | Winkler | |
| 7,689,328 B2 * | 3/2010 | Spinelli | 701/7 |
| 7,761,193 B2 | 7/2010 | Artini et al. | |
| 7,765,061 B1 | 7/2010 | Barber et al. | |
| 7,783,393 B2 | 8/2010 | Tucker et al. | |
| 7,853,370 B2 | 12/2010 | Coulmeau et al. | |
| 2004/0044446 A1 | 3/2004 | Staggs | |
| 2005/0182530 A1 | 8/2005 | Murphy | |
| 2006/0004496 A1 | 1/2006 | Tucker et al. | |
| 2007/0100515 A1 | 5/2007 | McClure | |
| 2009/0292483 A1 | 11/2009 | Journade et al. | |
| 2010/0026525 A1 * | 2/2010 | Feyereisen et al. | 340/972 |
| 2010/0039294 A1 * | 2/2010 | Feyereisen et al. | 340/972 |
| 2010/0082187 A1 * | 4/2010 | Nichols et al. | 701/16 |
| 2010/0265268 A1 | 10/2010 | Wilson et al. | |
| 2011/0246003 A1 * | 10/2011 | Lafon et al. | 701/16 |

FOREIGN PATENT DOCUMENTS

| | | |
|---|---|---|
| EP | 1764759 A1 | 3/2007 |
| EP | 1200949 B1 | 9/2008 |
| EP | 2261878 A1 | 12/2010 |
| WO | 2007006310 A2 | 1/2007 |

OTHER PUBLICATIONS

EP Search Report, EP 12162755.8-1557/2508847 dated Jun. 8, 2013.

* cited by examiner

*Primary Examiner* — George Bugg
*Assistant Examiner* — Edny Labbees
(74) *Attorney, Agent, or Firm* — Ingrassia Fisher & Lorenz, P.C.

(57) ABSTRACT

Systems and methods for informing a pilot of an aircraft about a topographical condition of a runway are disclosed herein. The system includes, but is not limited to, an electronic data storage unit configured to store location information and topographical condition information for a plurality of runways, a position determining unit that is configured to determine a geographical location of the aircraft, a display unit that is configured to display a graphical image, and a processor that is operatively coupled with each of the other components. The processor is configured to obtain the geographical location of the aircraft, identify a runway that the aircraft is approaching, obtain a subset of the topographical condition information relating to the runway, and command the display unit to display a vertical profile of the runway including a graphic depiction of the subset of the topographical condition information.

16 Claims, 7 Drawing Sheets

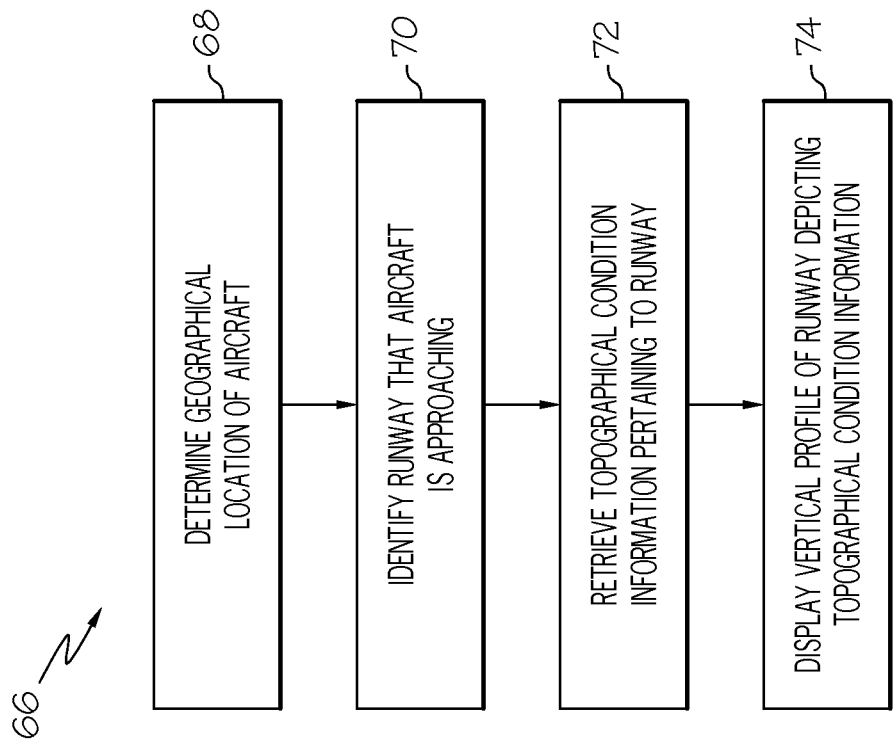

SYSTEMS AND METHODS FOR INFORMING A PILOT OF AN AIRCRAFT ABOUT A TOPOGRAPHICAL CONDITION

TECHNICAL FIELD

The present invention generally relates to an aircraft, and more particularly relates to a system and a method for informing a pilot of the aircraft about a topographical condition.

BACKGROUND

Not all aircraft runways are perfectly flat or planar. On the contrary, many airfields have runways that have undesirable topographical conditions. For example, some runways may have undulations (i.e., an alternating upward and downward swelling of the runway's upper surface). Others may be built into a hill and may have an upward or downward grade. Still others may have isolated bumps or patches of rough, broken, or uneven pavement. A pilot who is not familiar with the specific topographical conditions of a particular runway may incorrectly assume that the runway is substantially flat and smooth. Such a pilot may be surprised when taking-off and/or landing on a runway having one or more of the above described topographical conditions and may control the aircraft in a manner that adversely affects the aircraft.

For example, a pilot who is unaware that a particular runway has a valley formed by an undulation in the surface of the runway may lower the nose of the aircraft when landing in order to track the downward sloping surface of the runway. This may cause the nose gear of the aircraft to have a hard, jolting initial contact with the runway surface when the sloping surface of the runway changes direction and begins to slope upwardly. In some instances, the nose itself or the tail of the aircraft may make contact with runway if the changing slope of the runway surface is severe enough. On a runway having a patch of rough or uneven pavement or having an isolated bump, a pilot who is familiar with such topographical conditions may simply refrain from landing the aircraft until after the aircraft has flown over such topographical conditions by computing runway remaining distance to safely land. In the case of insufficient remaining runway distance, the pilot can follow the missed approach procedure. A pilot who is unfamiliar with such topographical conditions, however, may land the aircraft ahead of such topographical conditions, causing the landing gear, the nose gear, the nose and/or the tail of the aircraft to encounter the topographical conditions which, in turn, may cause the landing gear to experience excessive wear and tear.

Accordingly, it is desirable to make information about topographical conditions of the runway available to the pilot prior to takeoff and/or landing. In addition, it is desirable to present such information in a format that is easy for the pilot to understand. Furthermore, other desirable features and characteristics of the present invention will become apparent from the subsequent detailed description of the invention and the appended claims, taken in conjunction with the accompanying drawings and this background of the invention.

BRIEF SUMMARY

Systems and methods for informing a pilot of an aircraft about a topographical condition are disclosed herein.

In a first, non-limiting embodiment, the system includes, but is not limited to a processor that is configured to be operatively coupled with an electronic data storage unit, a position determining unit, and a display unit. The processor is configured to (i) obtain a geographical location of the aircraft from the position determining unit, (ii) identify a runway of a plurality of runways that the aircraft is approaching based on the geographical location of the aircraft and location information stored in the electronic data storage unit, (iii) obtain a subset of topographical condition information relating to the runway from the electronic data storage unit, and (iv) command the display unit to display a vertical profile of the runway including a graphic depiction of the subset of the topographical condition information.

In another non-limiting embodiment, the system includes, but is not limited to, an electronic data storage unit that is configured to store location information and topographical condition information for a plurality of runways. The system further includes a position determining unit that is configured to determine a geographical location of the aircraft. The system further includes a display unit that is configured to display a graphical image. The system still further includes a processor that is operatively coupled with the electronic data storage unit, the position determining unit, and the display unit. The processor is configured to: (i) obtain the geographical location of the aircraft from the position determining unit, (ii) identify a runway of the plurality of runways that the aircraft is approaching based on the geographical location of the aircraft and the location information stored in the electronic data storage unit, (iii) obtain a subset of the topographical condition information relating to the runway from the electronic data storage unit, and (iv) command the display unit to display a vertical profile of the runway including a graphic depiction of the subset of the topographical condition information.

In another non-limiting embodiment, the method includes, but is not limited to, the steps of determining a geographical location of the aircraft, identifying, with a processor, a runway that the aircraft is approaching, retrieving topographical condition information pertaining to the runway from an electronic data storage unit, and displaying a vertical profile of the runway depicting the topographical condition information.

BRIEF DESCRIPTION OF THE DRAWINGS

The present invention will hereinafter be described in conjunction with the following drawing figures, wherein like numerals denote like elements.

FIG. 7 is a block diagram illustrating an embodiment of a method for informing a pilot of an aircraft about a topographical condition of a runway.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A system and method for informing a pilot of an aircraft about a topographical condition of a runway are disclosed herein. The system may include a position determining unit, an electronic data storage unit, a display unit, and a processor. The position determining unit is configured to determine the geographical location of an aircraft with respect to the surface of the earth. The electronic data storage unit is configured to store information including the geographical location of a plurality of runways and the topographical conditions associated with each runway of the plurality of runways. The processor is configured to obtain the geographical location of the aircraft from the position determining unit and to utilize the information available in the electronic data storage unit to determine which runway of the plurality of runways the aircraft is approaching. The processor may concurrently or subsequently obtain information from the electronic data storage unit relating to the topographical condition of the runway that the aircraft is approaching. The processor may then send commands to the display unit causing the display unit to display a vertical profile of the runway that the aircraft is approaching. The vertical profile will include a graphic depiction of any topographical conditions associated with that runway. In this manner, the pilot of the aircraft can become informed about any and all topographical conditions associated with a runway prior to encountering such topographical conditions.

A greater understanding of systems and methods for informing a pilot of an aircraft about a topographical condition of a runway may be obtained through a review of the illustrations accompanying this application together with a review of the detailed description that follows.

Figure 1:
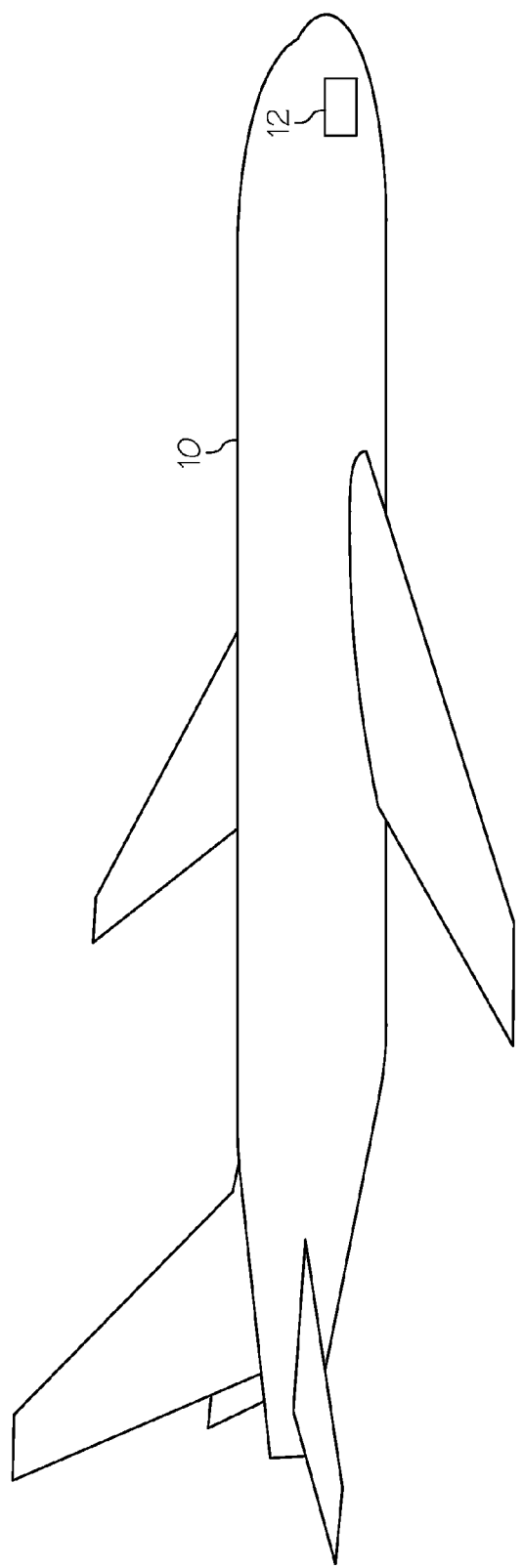
FIG. 1 is a schematic view illustrating an aircraft equipped with an embodiment of a system for informing a pilot of the aircraft about a topographical condition of a runway.

FIG. 1 is a schematic view illustrating an aircraft 10 equipped with an embodiment of a system 12 for informing a pilot of aircraft 10 about a topographical condition of a runway. Although system 12 is depicted herein as being implemented on an aircraft, it should be understood that system 12 is compatible for use with other types of vehicles as well. For example, system 12 may be implemented on an automobile, a spacecraft, a submarine, other types of watercraft, and any other type of vehicle that encounters a ground surface.

Figure 2:
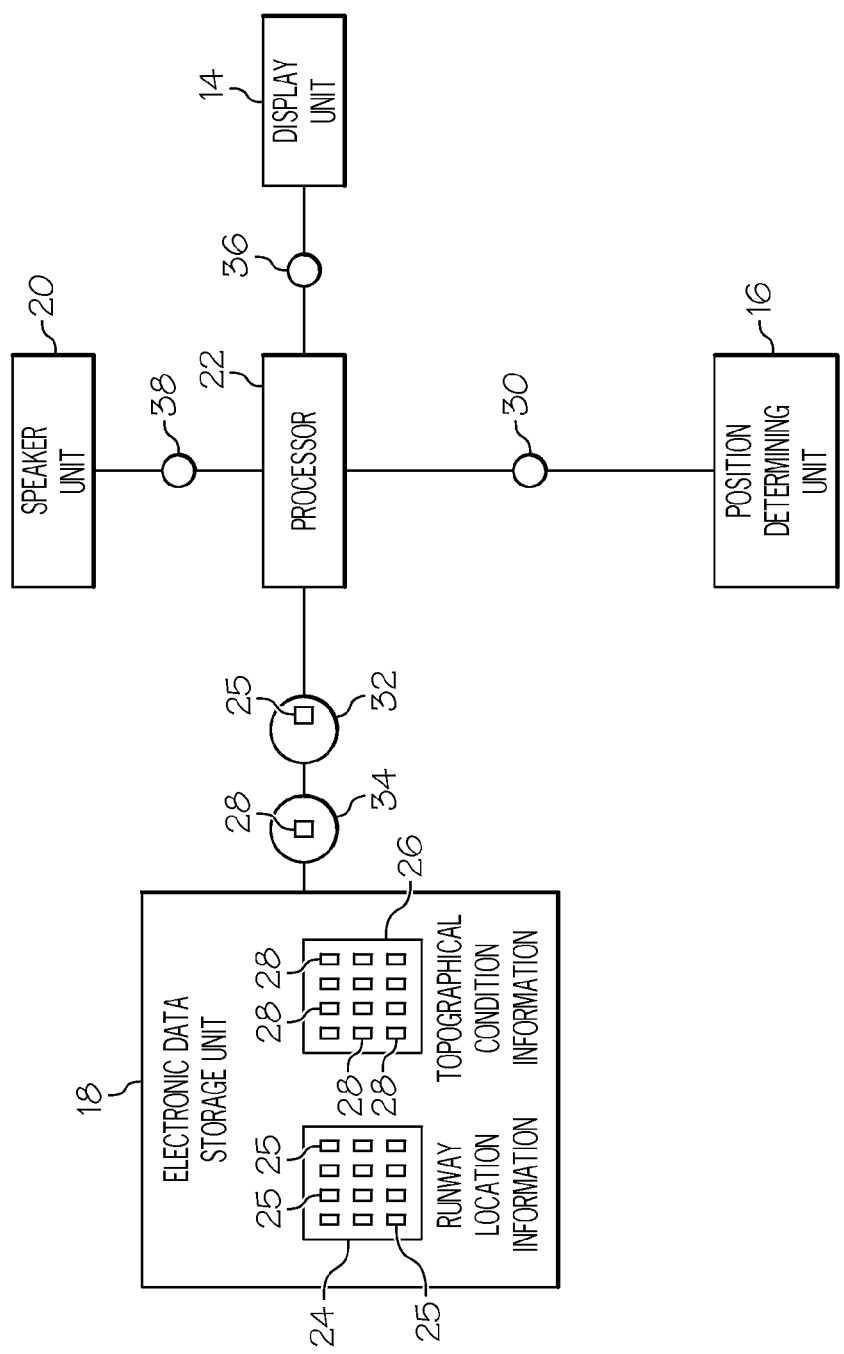
FIG. 2 is a schematic view illustrating the system of FIG. 1.

FIG. 2 is an expanded schematic view illustrating the system of FIG. 1. With continuing reference to FIG. 1, system 12 includes a display unit 14, a position determining unit 16, an electronic data storage unit 18, a speaker unit 20, and a processor 22. Other embodiments of system 12 may have a greater or lesser number of components without departing from the teachings of the present disclosure. For example, other embodiments may exclude speaker unit 20 and/or may include multiple display units, multiple speaker units, communication units, input devices, and various sensors that are configured to detect topographical conditions.

Display unit 14 may be any sort or type of display system that is configured to depict graphic images. In some embodiments, it may be desirable to select a display system that is also capable of displaying text. Some non-limiting examples of suitable display systems include a Cathode Ray Tube (CRT) display device, a flat panel display device, a Liquid Crystal Display (LCD) device, a thin film transistor (TFT) display device, a plasma display device, an electro-luminescent display device, a Light Emitting Diode (LED) display device, an Organic LED (OLED), a holographic display device such as a Heads Up Display (HUD), a Micro Mirror Device (MMD) display device, or the like. Additionally, the schematically represented display unit 14 may include multiple individual display screens communicatively connected or otherwise configured to cooperate with one another. One example of a suitable display unit 14 would include any type of synthetic vision system display such as an integrated primary flight display. Synthetic vision system displays are well known in the art and are frequently configured to provide aircraft operators with three-dimensional depictions of terrain around the aircraft and to present text and symbology over such three-dimensional depictions. Other suitable displays may include near to eye displays worn by pilots and configured to present images on a screen, lens or projector disposed proximate to the pilot's eye. In still other embodiments, display unit 14 may comprise a HUD. In some embodiments, display unit 14 may be dedicated for use exclusively with system 12 while in other embodiments display unit 14 may be shared with other systems on board aircraft 10.

In the illustrated embodiment, position determining unit 16 is configured to detect and/or to determine the position of aircraft 10 with respect to the earth (e.g., latitude and longitude coordinates) as well as the heading of aircraft 10 and, in some examples, the altitude of aircraft 10. In some non-limiting embodiments, position determining unit 16 may be a single integrated unit such as, but not limited to, a global positioning system (GPS), any other type of satellite navigation system, or an inertial navigation system. In other non-limiting embodiments, position determining unit 16 may comprise multiple discrete systems, each providing one or more items of information pertaining to the location of aircraft 10, which may be aggregated together to arrive at the geographical location, altitude, and heading of aircraft 10. In some embodiments, position determining unit 16 may be configured to determine the position of aircraft 10 at regular time intervals, while in other embodiments, position determining unit 16 may be configured to determine the position of aircraft 10 only in response to an interrogation made by another onboard system for such location information. In still other embodiments, position determining unit 16 may be configured to determine the position of aircraft 10 both at regular intervals and also in response to an interrogation received from other onboard systems. In some embodiments, position determining unit 16 may be dedicated for use exclusively with system 12, while in other embodiments, position determining unit 16 may be shared with other systems on board aircraft 10.

In the illustrated embodiment, electronic data storage unit 18 is an electronic memory device that is configured to store data. Electronic data storage unit 18 may be any type of data storage component including, without limitation, non-volatile memory, disk drives, tape drives, and mass storage devices and may include any suitable software, algorithms and/or sub-routines that provide the data storage component with the capability to store, organize, and permit retrieval of data. In the illustrated embodiment, electronic data storage unit 18 is configured to store runway location information 24 relating to the geographical location of a plurality of runways. Each runway and its associated location data may be stored in a separate data file 25. Electronic data storage unit 18 is further configured to store topographical condition information 26 which includes information relating to any and all topographical conditions associated with each of the runways that are stored in runway location information 24. As used herein, the term "topographical condition" shall mean any permanent or semi-permanent condition of the runway surface that may affect aircraft 10 during takeoffs and landings. In some embodiments, topographical condition information 26 may be organized and/or arranged into multiple discrete subsets 28, each subset containing data relating to a specific runway. In other embodiments, the topographical condition information associated with each runway may be stored in each data file 25. In still other embodiments, runway location information 24 and/or topographical condition information 26 may be stored remotely with a ground based system and the aircraft may be configured to retrieve that information wirelessly. For example, runway location information 24 and the topographical condition information 26 may be stored at a ground based system located an airfield and system 12 may further include a wireless transmitter and a wireless receiver. In such embodiments, system 12 may be configured to interrogate the ground based system at each airfield to obtain an upload of topographical information 26 which could be temporarily stored in electronic data storage unit 18 or loaded directly into RAM for usage by processor 22, as discussed in detail below.

Speaker unit 20 may be any device, mechanism, and/or unit that is configured to emit an audible sound that is detectable by the human ear. In some embodiments, speaker unit 20 may be a separate and distinct component while in other embodiments, speaker unit 20 may be incorporated into any of the other components. For example, display unit 14 may incorporate a speaker unit 20.

Processor 22 may be any type of computer, computer system, or microprocessor that is configured to perform algorithms, to execute software applications, to execute sub-routines and/or to be loaded with and to execute any other type of computer program. Processor 22 may comprise a single processor or a plurality of processors acting in concert. In some embodiments, processor 22 may be dedicated for use exclusively with system 12, while in other embodiments processor 22 may be shared with other systems on board aircraft 10.

Processor 22 is operatively coupled to display unit 14, position determining unit 16, electronic data storage unit 18, and speaker unit 20. Such operative coupling may be implemented through the use of any suitable means of transmission including both wired and wireless connections. For example, each component may be physically connected to processor 22 via a coaxial cable or via any other type of wired connection effective to convey signals. In the illustrated embodiment, processor 22 is directly operatively coupled to each of the other components. In other embodiments, each component may be operatively coupled to processor 22 across a vehicle bus. In still other examples, each component may be wirelessly operatively coupled to processor 22 via a Bluetooth connection, a WiFi connection or the like.

Being operatively coupled provides a pathway for the transmission of commands, instructions, interrogations and other signals between processor 22 and each of the other components. Through this operative coupling, processor 22 may control and/or communicate with each of the other components. Each of the other components discussed above may be configured to interface and engage with processor 22. For example, in some embodiments, display unit 14 may be configured to receive commands from processor 22 and to display graphical images in response to such commands. In some embodiments, position determining unit 16 may be configured to automatically provide geographical location information to processor 22 at regular intervals while in other embodiments, position determining unit 16 may be configured to provide geographical location information to processor 22 in response to an interrogation received from processor 22. In some embodiments, electronic data storage unit 18 may be configured to receive interrogations from processor 22 and to retrieve and provide data, including one or more topographical condition information subsets 28 to processor 22 in response to such interrogations. In some embodiments, speaker unit 20 may be configured to receive commands from processor 22 and to emit audible sounds in response to such commands. Such audible sounds may include human language and or non-human language sounds.

In an embodiment, processor 22 is configured to interact with, coordinate and/or orchestrate the activities of each of the other components of system 12 for the purpose of informing a pilot of an aircraft about a topographical condition of a runway. In a non-limiting example of an implementation of system 12, processor 22 is programmed and/or otherwise configured to obtain geographical location 30 of aircraft 10 from position determining unit 16. In some embodiments, processor 22 may be configured to periodically and automatically interrogate position determining unit 16 for the geographical location of aircraft 10 while in other embodiments, processor 22 may be configured to receive geographical location information that is sent periodically and automatically by position determining unit 16.

Once processor 22 has obtained a geographical location 30, processor 22 is configured to interrogate electronic data storage unit 18 to acquire runway location information 24. Using runway location information 24, processor 22 is configured to identify a specific runway 32 of the plurality of runways that are identified in runway location information 24 that aircraft 10 is heading towards and/or approaching. Once processor 22 has identified specific runway 32, processor 22 is configured to identify a specific subset 34 of topographical condition information that relates to specific runway 32. In some embodiments, specific subset 34 of topographical condition information may indicate the type of runway anomalies that are present, the relative locations of the anomalies, the physical characteristics of the anomalies (e.g., their height and width), and the like. In other embodiments, the specific subset 34 of topographical condition information may include information that enables processor 22 to plot the vertical profile point by point.

Once processor 22 has obtained specific subset 34 from electronic data storage unit 18, processor 22 is configured to send a command 36 to display unit 14 to display vertical profile of specific runway 32 including a graphical representation of any and all topographical conditions that will be of interest to the pilot of aircraft 10. Processor 22 is further configured to send a command 38 to speaker unit 20 causing speaker unit 20 to emit an audible alarm to alert the pilot of aircraft 10 about the topographical condition(s) present at specific runway 32.

In some embodiments, system 12 may be triggered by a request initiated by the pilot or an aircrew member of aircraft 10. In other embodiments, processor 22 may be configured to automatically initiate the process of displaying the vertical profile of the runway that aircraft 10 is heading towards. For example, processor 22 may be configured to periodically interrogate position determining unit 16 for geographical location information and may be further configured to command display unit 14 to display the vertical profile of specific runway 32 when aircraft 10 approaches to within a predetermined distance of specific runway 32.

Figure 3:
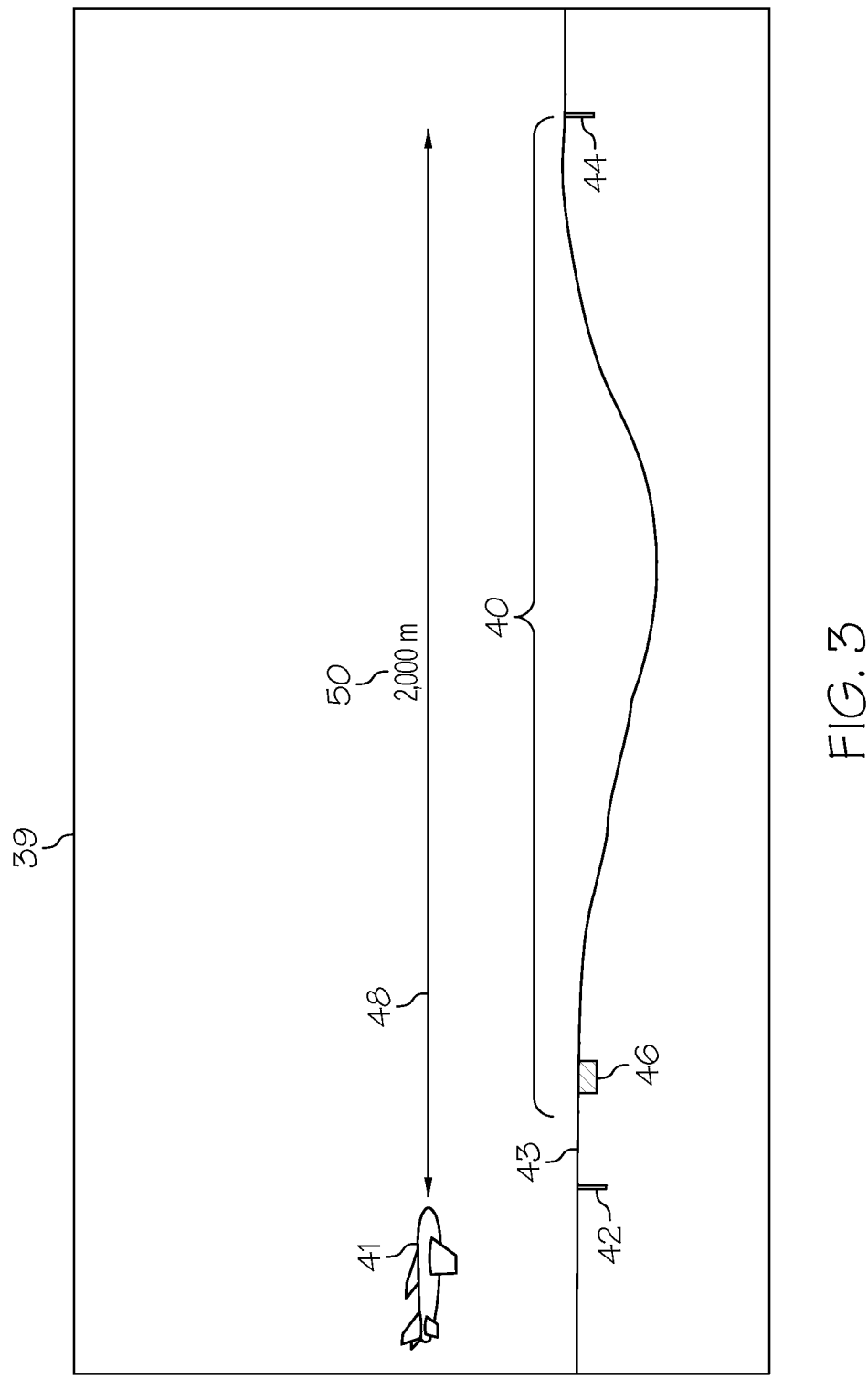
FIG. 3 is an exemplary vertical profile generated by the system of FIG. 2 including an aircraft on approach to a runway and a topographical condition of the runway.

FIG. 3 is an exemplary vertical profile 39 that includes an aircraft symbol 41 representing an aircraft equipped with the system described above. Aircraft symbol 41 is depicted as being on approach to a runway which is represented by a runway symbol 43. A topographical condition 40 of runway symbol 43 is also depicted. With continuing reference to FIGS. 1-2, vertical profile 39 may be displayed on any suitable portion of a display screen of display unit 14. Vertical profile 39 may consume only a portion of, or the entirety of, the display screen of display unit 14. In some embodiments, a pilot or aircrew member may be enabled to adjust the size and/or the location of vertical profile 39 on the display screen.

Processor 22 is configured to command display unit 14 to display aircraft symbol 41, runway symbol 43, and topographical condition 40 at positions that are representative of the actual positional relationship between aircraft 10, specific runway 32, and the actual topographical condition of specific runway 32. In this manner, a pilot of aircraft 10 can, with a glance, obtain a situational awareness relating to the topographical condition(s) present at specific runway 32 and the relationship of aircraft 10 with respect to both specific runway 32 and the topographical condition associated with specific runway 32. In the example shown in FIG. 3, topographical condition 40 is an undulation of the surface of specific runway 32 in the longitudinal direction of specific runway 32. In other examples, shown below, other topographical conditions may also be illustrated. In still other examples, text may be included to further identify the runway anomaly present.

Vertical profile 39 also contains numerous other graphic images and annotations. For example, runway symbol 43 is delineated by a start marker 42 and an end marker 44 to help the pilot identify the boundaries of specific runway 32. Also identified in vertical profile 39 is a touchdown point 46 indicating the location on specific runway 32 where the rear wheels of aircraft 10 are expected to first make contact with the specific runway 32. A remaining-runway-length marker 48 is provided to inform the pilot as to how much runway remains in front of the aircraft. Remaining-runway-length marker 48 includes an annotation 50. Annotation 50 includes characters and numbers that inform the pilot of the approximate remaining length of specific runway 32 that is located in front of aircraft 10. As illustrated below, both of the length of remaining-runway-length marker 48 and annotation 50 will change as aircraft 10 (and, correspondingly, aircraft symbol 41) progresses along a flight path.

Figure 4:
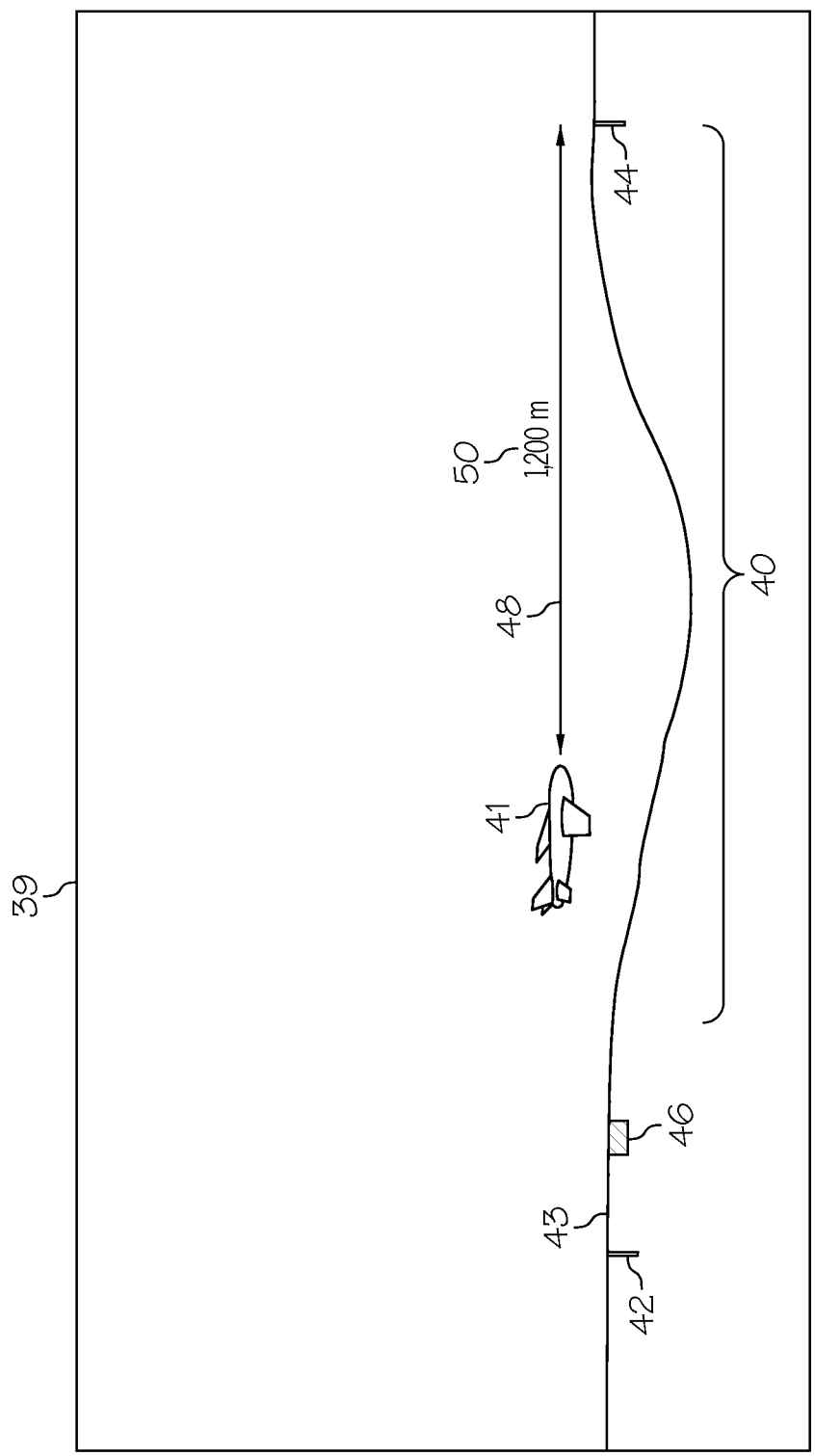
FIG. 4 is an exemplary vertical profile similar to the vertical profile illustrated in FIG. 3, wherein the aircraft is in the process of landing on the runway.

FIG. 4 illustrates vertical profile 39 with aircraft symbol 41 further downrange from the position depicted in FIG. 3. With continuing reference to FIGS. 1-3, as illustrated in FIG. 4, the pilot did not land aircraft 10 at touchdown point 46 and is currently flying aircraft 10 down into a valley formed by the undulation of topographical condition 40. In this situation, vertical profile 39 provides useful information to the pilot of aircraft 10 such as the relative position of aircraft 10 with respect to the location on specific runway 32 where the surface of specific runway 32 will start to turn in an upward direction. This information will allow the pilot of aircraft 10 to determine an appropriate nose-down angle for aircraft 10.

Also depicted in FIG. 4 are a revised remaining-runway-length marker 48 and a revised annotation 50. The length of remaining-runway-length marker 48 has shortened and the characters displayed in annotation 50 have changed to reflect the current remaining length of specific runway 32.

Figure 5:
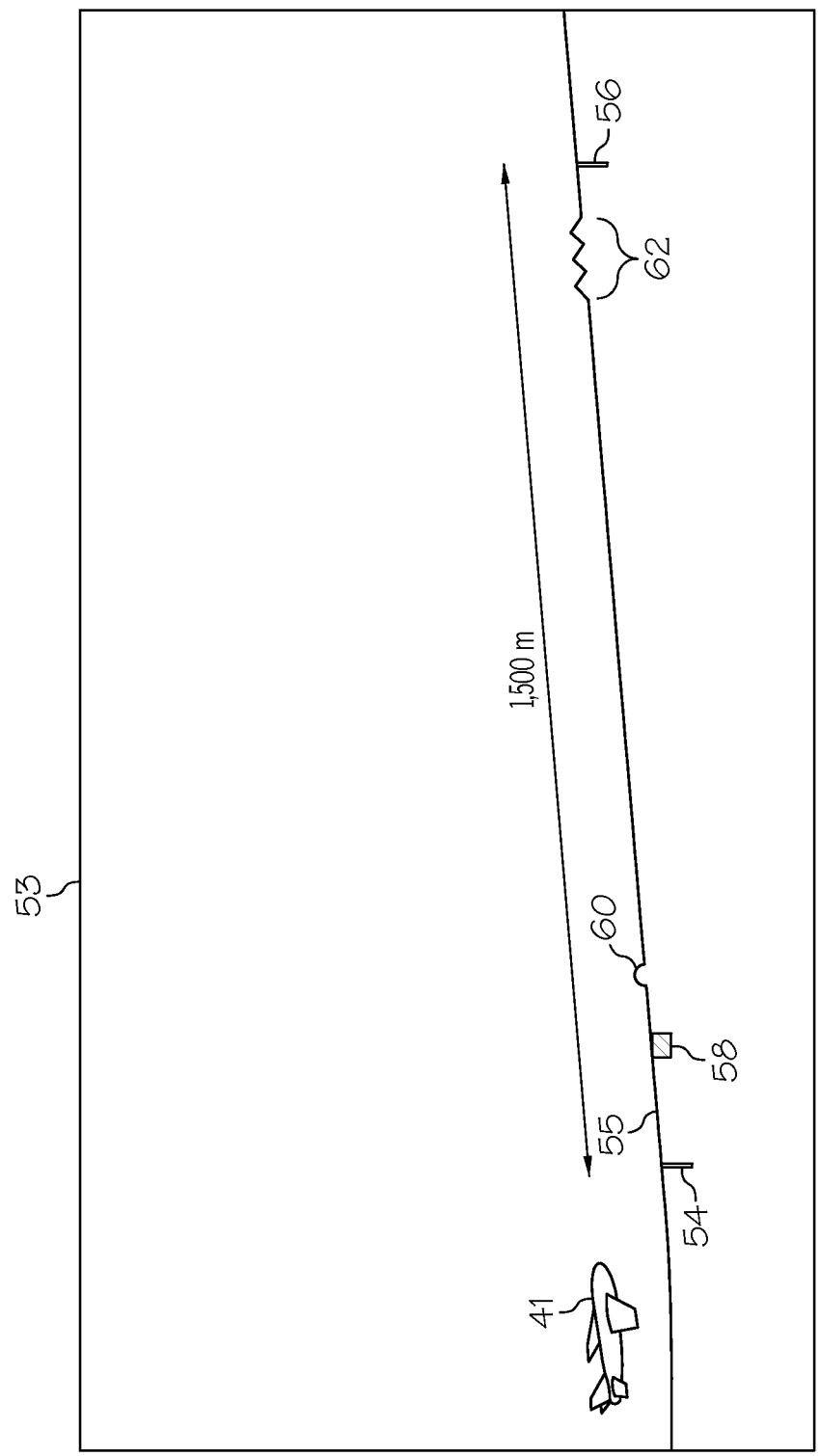
FIG. 5 is an exemplary vertical profile depicting an aircraft on approach to another runway having multiple topographical conditions.

FIG. 5 illustrates a vertical profile 53, which has been generated by system 12 (described above) as aircraft symbol 41 comes in for a landing at another airport. With continuing reference to FIGS. 1-4, vertical profile 53 illustrates a runway symbol 55 having a start marker 54, an end marker 56, and a touchdown point 58. Also illustrated in vertical profile 53 is a topographical condition 60 and a topographical condition 62. Topographical condition 60 is an isolated bump rising in an upward direction from a surface of the runway while topographical condition 62 is a patch of rough pavement. A pilot of aircraft 10 may utilize the information presented in vertical profile 53 to determine where to touchdown aircraft 10 (e.g., after aircraft 10 has flown past topographical condition 60) and how aggressively to apply the brakes and reverse thrusters (e.g., aggressively enough to avoid encountering topographical condition 62 towards the end of the runway).

Figure 6:
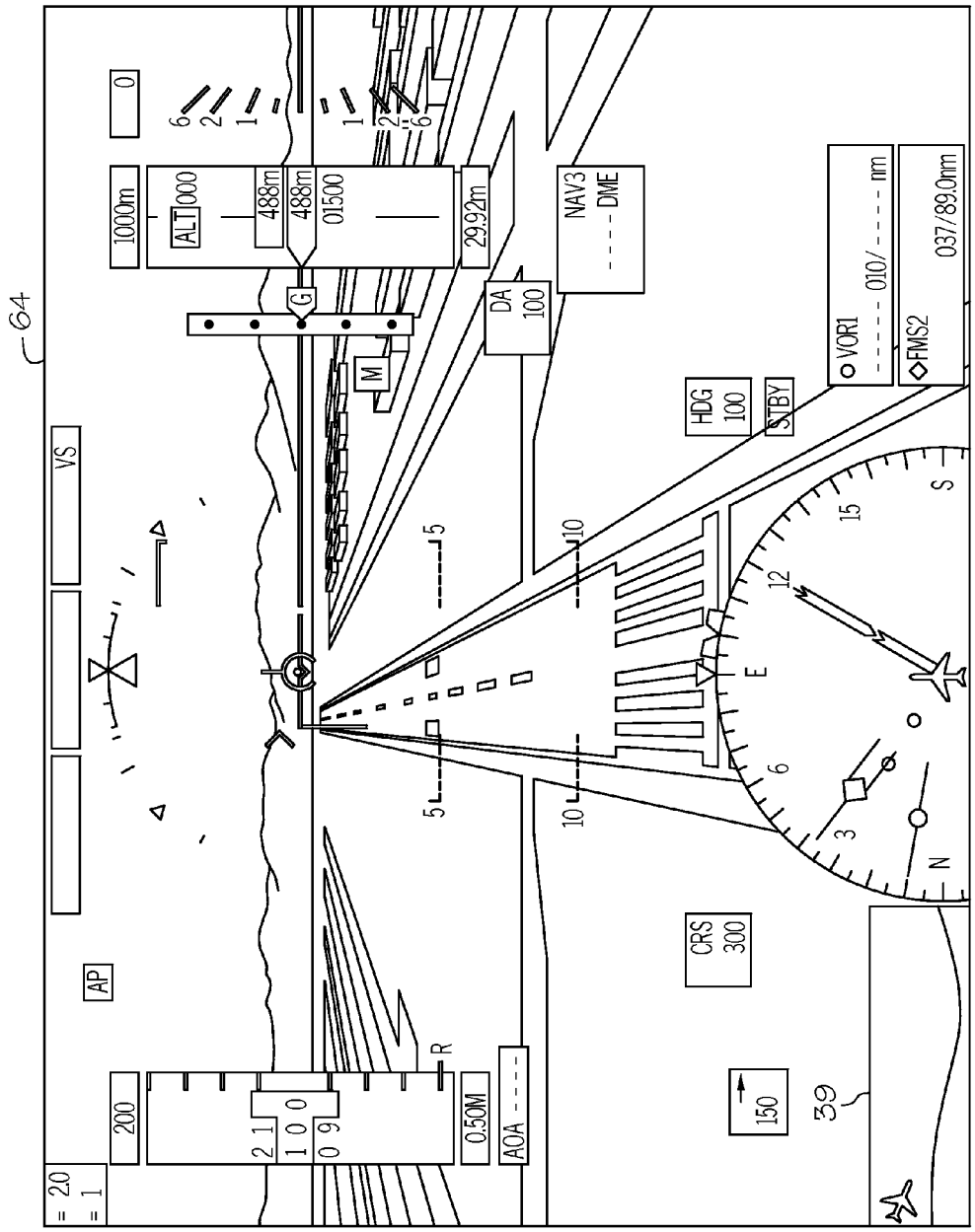
FIG. 6 is an exemplary Synthetic Vision System display incorporating the display of FIGS. 2-4.

FIG. 6 is an exemplary view of a synthetic vision system display 64 as rendered by a synthetic vision system. Synthetic vision systems are well known in the art and are capable of providing a pilot with a three-dimensional view of the environment around and in front of an aircraft. Incorporated into synthetic vision system display 64 is vertical profile 39 (which has been described above). In some embodiments, processor 22 may control both the synthetic vision system display 64 and vertical profile 39 and may synchronize the two displays.

FIG. 7 is a block diagram illustrating an example of a method 66 for informing a pilot of an aircraft about a topographical condition of a runway. At block 68, the geographical location of aircraft is determined. This determination can be made using any suitable system or method including, but not limited to, the use of GPS or an inertial navigation system.

At block 70, once the geographical location of the aircraft has been determined, a runway that the aircraft is approaching is identified. This determination can be based on the geographical location of the aircraft and may be made in any suitable manner including through the use of a database stored in an electronic data storage unit that includes the identity of the plurality of airports and their associated geographical locations.

At block 72, a topographical condition of the runway that the aircraft is approaching is retrieved from an electronic data storage unit. In some examples of method 66, the topographical condition of the runway may be retrieved at the same time that the runway is identified.

At block 74, a vertical profile of the runway is displayed on a display screen located onboard the aircraft. The vertical profile the runway includes a graphical depiction of the topographical condition(s) associated with the runway. In some examples, the vertical profile may also include symbols representing the aircraft, the runway, the runway's boundaries, the runway's length, types of topographical conditions, and may also include annotations relating to each of the foregoing. In some examples, an audible alarm (e.g., "runway profile view", "undulated runway ahead" and/or "uneven runway ahead") may be emitted to assist in informing a pilot about the topographical condition associated with the runway.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for informing a pilot of an aircraft about a topographical condition of a runway, the system comprising:
   a processor configured to be operatively coupled with an electronic data storage unit, a position determining unit, and a display unit, the processor configured to:
   (i) obtain a geographical location of the aircraft from the position determining unit,
   (ii) identify a runway of a plurality of runways that the aircraft is approaching based on the geographical location of the aircraft and location information stored in the electronic data storage unit, the runway having a runway surface, (iii) obtain a subset of topographical condition information relating to the runway from the electronic data storage unit, the topographical condition information comprising an actual topographical condition of the runway surface that may affect the aircraft during takeoffs and landings, and (iv) command the display unit to simultaneously display:
(a) an aircraft symbol,
(b) a vertical profile of the runway that includes a graphic depiction of the actual topographical condition, and
(c) a touchdown point graphic representative of a location on the runway where the aircraft is expected to make contact with the runway,
wherein:
the aircraft symbol, the runway, and the graphic depiction of the actual topographical condition are simultaneously displayed on the display unit at positions that are representative of actual positional relationships between the aircraft, the runway, and the actual topographical condition.

2. The system of claim 1, wherein the actual topographical condition comprises a runway undulation.

3. The system of claim 1, wherein the actual topographical condition comprises a runway grade.

4. The system of claim 1, wherein the actual topographical condition comprises an isolated bump in a runway surface.

5. The system of claim 1, wherein the actual topographical condition comprises a rough runway surface.

6. The system of claim 1, wherein the processor is configured to command the display unit to display a second symbol in the vertical profile that is indicative of a remaining length of the runway.

7. The system of claim 1, wherein the processor is further configured to command the display unit to include an annotation in the vertical profile of the runway.

8. The system of claim 1, wherein the processor is further configured to command the display unit to display the aircraft symbol, the vertical profile, and the touchdown point graphic vertical profile when the aircraft reaches a predetermined distance from the runway.

9. A system for informing a pilot of an aircraft about a topographical condition of a runway, the system comprising:
an electronic data storage unit configured to store location information and topographical condition information for a plurality of runways, each runway having a runway surface, the topographical condition information comprising conditions of each runway surface that may affect the aircraft during takeoffs and landings,
a position determining unit configured to determine a geographical location of the aircraft;
a display unit configured to display a graphical image; and
a processor operatively coupled with the electronic data storage unit, the position determining unit, and the display unit, the processor being configured to:
(i) obtain the geographical location of the aircraft from the position determining unit,
(ii) identify a runway of the plurality of runways that the aircraft is approaching based on the geographical location of the aircraft and the location information stored in the electronic data storage unit,
(iii) obtain a subset of the topographical condition information relating to the runway from the electronic data storage unit, the topographical condition information comprising an actual topographical condition of the runway surface that may affect the aircraft during takeoffs and landings, and
(iv) command the display unit to simultaneously display:
(a) an aircraft symbol,
(b) a vertical profile of the runway that includes a graphic depiction of the actual topographical condition, and
(c) a touchdown point graphic representative of a location on the runway where the aircraft is expected to make contact with the runway,
wherein:
the aircraft symbol, the runway, and the graphic depiction of the actual topographical condition are simultaneously displayed on the display unit at positions that are representative of actual positional relationships between the aircraft, the runway, and the actual topographical condition.

10. The system of claim 9, wherein the actual topographical condition comprises a runway undulation.

11. system of claim 9, wherein the actual topographical condition comprises a runway grade.

12. The system of claim 9, wherein the actual topographical condition comprises an isolated bump in a runway surface.

13. The system of claim 9, wherein the actual topographical condition comprises a rough runway surface.

14. The system of claim 9, wherein the processor is configured to command the display unit to display a second symbol in the vertical profile that is indicative of a remaining length of the runway.

15. The system of claim 9, wherein the processor is further configured to command the display unit to display the aircraft symbol, the vertical profile, and the touchdown point graphic when the aircraft reaches a predetermined distance from the runway.

16. The system of claim 9, further comprising a speaker unit configured to emit audible sounds, wherein the processor is operatively coupled with the speaker unit and wherein the processor is further configured to command the speaker unit to emit an audible alarm when the aircraft reaches a predetermined distance from the runway.

* * * * *